US 8,439,004 B2

(12) United States Patent
Rabhi et al.

(10) Patent No.: US 8,439,004 B2
(45) Date of Patent: May 14, 2013

(54) BALL-LIFT DEVICE WITH SCREW FOR A VARIABLE COMPRESSION RATIO ENGINE

(75) Inventors: Vianney Rabhi, Lyons (FR); Bruno Toulouse, Tain l'Hermitage (FR)

(73) Assignee: Vianney Rabhi, Lyons (FR)

( * ) Notice: Subject to any disclaimer, the term of this patent is extended or adjusted under 35 U.S.C. 154(b) by 501 days.

(21) Appl. No.: 12/680,814

(22) PCT Filed: Jun. 26, 2009

(86) PCT No.: PCT/FR2009/000796
§ 371 (c)(1),
(2), (4) Date: Apr. 27, 2010

(87) PCT Pub. No.: WO2009/156624
PCT Pub. Date: Dec. 30, 2009

(65) Prior Publication Data
US 2010/0218745 A1     Sep. 2, 2010

Related U.S. Application Data

(60) Provisional application No. 61/076,364, filed on Jun. 27, 2008.

(30) Foreign Application Priority Data

Jun. 27, 2008   (FR) .................................... 08 03615

(51) Int. Cl.
*F02B 75/04* (2006.01)
*F02B 75/26* (2006.01)
*F02B 75/32* (2006.01)
*F02D 15/04* (2006.01)

(52) U.S. Cl.
USPC ................... 123/48 B; 123/48 R; 123/48 AA; 123/197.1

(58) Field of Classification Search ................ 123/48 R, 123/48 AA, 48 B, 197.1
See application file for complete search history.

(56) References Cited

U.S. PATENT DOCUMENTS 3,296,936 A * 1/1967 Wess et al. ........................ 91/49
3,850,081 A * 11/1974 Joelson ............................ 91/515

(Continued)

FOREIGN PATENT DOCUMENTS

DE   10 2005 010 098     9/2006
FR        997 725         1/1952

(Continued)

OTHER PUBLICATIONS

International Search Report dated Jan. 18, 2010, from corresponding PCT application.

*Primary Examiner* — Lindsay Low
*Assistant Examiner* — Tea Holbrook
(74) *Attorney, Agent, or Firm* — Young & Thompson

(57) ABSTRACT

A ball-lift device with screw for a variable compression ratio engine having a hydraulic double-acting control actuator (8) including an upper chamber (121) and a lower chamber (122) and at least one actuator piston (13) connected to a control rack (7) includes:
at least two balls (401, 402) or valve elements each resting on a seat (403, 404) and closing off respectively one and the other end of a transfer channel (405) connecting the upper chamber and the lower chamber of the control actuator, the balls acting as a nonreturn valve element when they are held on their seat by a spring (408, 409) in order to allow the hydraulic fluid to pass in only one direction;
and lifting element (410) including at least one electric motor (480) designed to rotate at least one screw (481, 482) making it possible to lift from or place on its seat at least one ball.

22 Claims, 5 Drawing Sheets

U.S. PATENT DOCUMENTS

| | | | |
|---|---|---|---|
| 4,546,298 A * | 10/1985 | Wickham et al. | 318/372 |
| 6,354,252 B1 | 3/2002 | Rabhi | |
| 6,601,551 B1 | 8/2003 | Rabhi | |
| 7,013,849 B2 | 3/2006 | Rabhi | |
| 7,059,280 B2 * | 6/2006 | Nohara et al. | 123/48 D |
| 7,562,642 B2 * | 7/2009 | Rabhi | 123/48 B |

FOREIGN PATENT DOCUMENTS

| | | |
|---|---|---|
| FR | 2 131 412 | 11/1972 |
| FR | 2 896 539 | 7/2007 |
| FR | 2 896 544 | 7/2007 |
| FR | 2 919 022 | 1/2009 |
| FR | 2 933 140 | 1/2010 |
| WO | 98/51911 | 11/1998 |
| WO | 00/31377 | 6/2000 |
| WO | 03/008783 | 1/2003 |
| WO | 2007/085739 | 8/2007 |

* cited by examiner

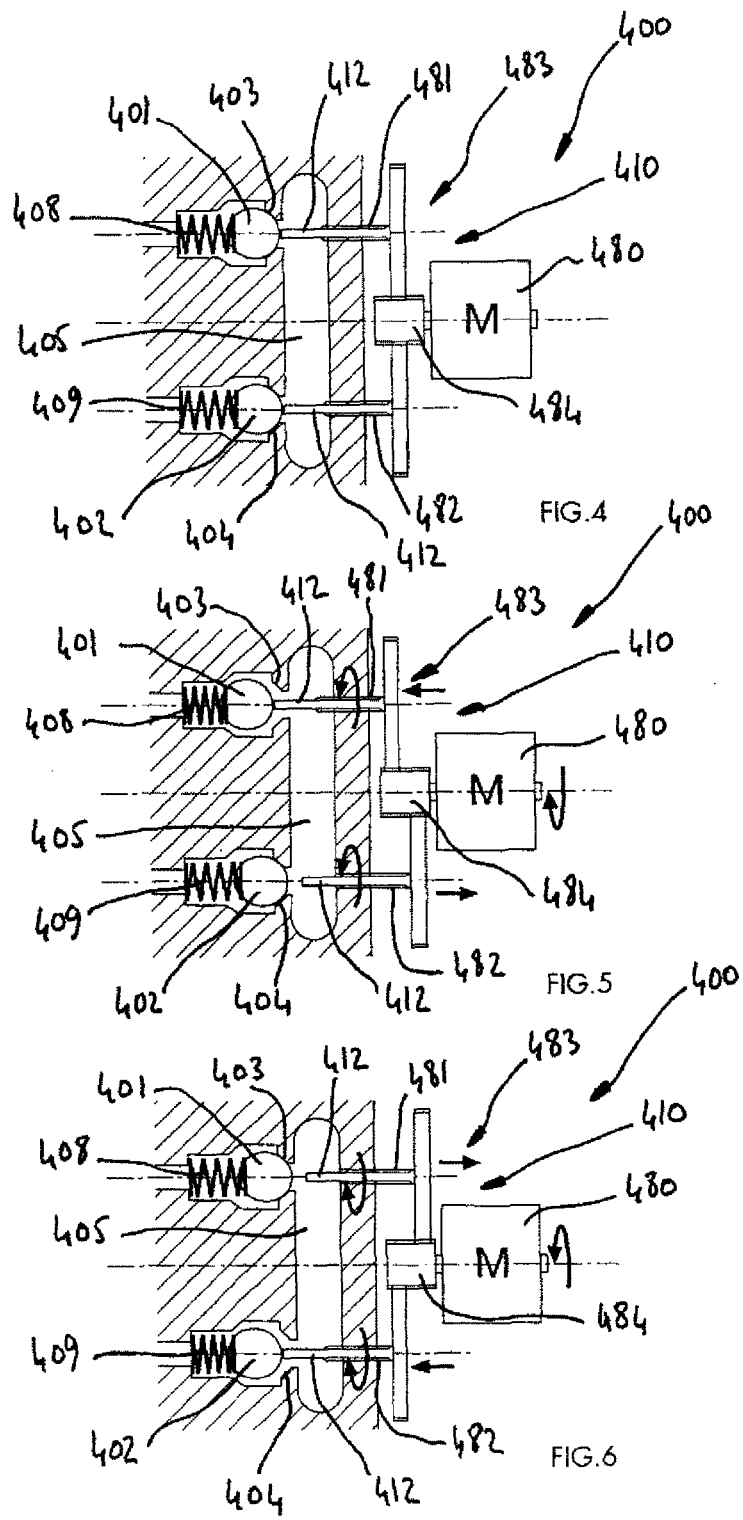

BALL-LIFT DEVICE WITH SCREW FOR A VARIABLE COMPRESSION RATIO ENGINE

The present invention relates to a ball-lift device with screw for a variable compression ratio engine comprising at least one rotary electric motor designed to rotate at least one screw making it possible to lift from or place on its seat at least one ball or valve element of a control actuator which makes it possible to control the compression ratio of said variable compression ration engine.

The ball is designed to close off one end or the other of a transfer channel connecting the upper and lower chamber of the control actuator which, when it is held by a spring on its seat, acts as a nonreturn valve element so as to allow the hydraulic fluid to pass in only one direction.

According to International Patents WO98/51911, WO00/31377, WO03/008783 belonging to the Applicant, various mechanical devices are known for a variable displacement engine.

Note that International Patent WO98/51911 in the name of the Applicant describes a device used to improve the efficiency of internal-combustion piston engines used at variable load and speed by adaptation while running of their effective displacement and/or of their volumetric ratio. This type of engine being known to those skilled in the art as a "variable compression ratio engine", this name will be used in the following text.

It is known that, according to International Patent WO00/31377 in the name of the Applicant, the mechanical transmission device for a variable compression ratio engine comprises a combustion piston, secured in its lower portion to a transmission member, interacting on the one hand with a rolling guidance device, and on the other hand with a gearwheel secured to a connecting rod making it possible to transmit the movement between said piston and said connecting rod.

Note that, according to International Patent WO03/008783 in the name of the Applicant, the mechanical transmission device for a variable compression ratio engine comprises at least one cylinder in which a combustion piston moves which is secured, in its lower portion, to a transmission member also called a "piston rack" interacting on the one hand by means of a small-dimension rack with a rolling guidance device, and on the other hand by means of another large-dimension rack with a gearwheel secured to a connecting rod. Said mechanical transmission device for a variable compression ratio engine also comprises at least one control rack interacting with the gearwheel, means for attaching the combustion piston to the transmission member which offer a clamping prestress, connection means which make it possible to stiffen the teeth of the racks, and means for reinforcing and lightening the structure of the gearwheel.

Note that the minimal operating clearance between the teeth of the large-dimension racks and those of the gearwheel is fixed by the location of bearing surfaces made on said large-dimension racks and on said gearwheel.

Note that, according to Patent Application FR 2 896 544, the variable compression ratio engine comprises a common cylinder head which interacts with a crankcase in order to close on the one hand the end of at least one cylinder of the engine at its combustion chamber, and on the other hand the end of at least one cylinder of a control actuator of said engine at the upper chamber of said actuator, said crankcase containing all of the components of the movable coupling of the variable volumetric ratio engine.

Note that, according to Patent Application FR 2 896 539, the variable compression ratio engine has at least one lifter actuator which allows the rolling surfaces to remain permanently in contact with one another in order to control the acoustic emissions of said engine and to increase the manufacturing tolerances of its crankcase, said variable compression ratio engine having as many lifter actuators and control actuators as it has cylinders.

Note also that, according to Patents WO98/51911 and FR 2 896 539, the vertical position of the control rack of the variable compression ratio engine is controlled by a control actuator which comprises an inlet of pressurized hydraulic fluid provided in order to compensate for possible leaks from said control actuator, and in order to provide a precharge pressure designed to increase the accuracy of maintenance of the vertical-position setpoint of said control actuator by reducing the effects of the compressibility of the oil, and designed to prevent any cavitation phenomenon inside the chambers of said actuator.

It is noted that, in Patent WO98/51911, the control actuator comprises a lower chamber and an upper chamber the displacement of which is kept identical to that of said lower chamber by virtue of an actuator spindle extender, also called upper actuator rod. Also according to Patent WO98/51911, the control actuator also comprises an actuator piston, valves kept in place by springs, and a control rod, the upper end of said actuator being closed by a cylinder head which comprises sealing means between said cylinder head and said upper actuator rod on the one hand and between said cylinder head and said control rod on the other hand.

As claimed in French Patent Applications FR 2 896 539 and FR 07/05237 in the name of the Applicant, the variable compression ratio engine comprises a hydraulic power unit provided on the one hand to supply to its lifter actuator(s) the hydraulic pressure necessary for them to operate and on the other hand to provide its control actuator(s) with the hydraulic pressure necessary to compensate for their possible hydraulic leaks and to increase their accuracy. It is noted that said unit is supplied with oil by the lubrication circuit of the engine, via a high-pressure pump that is able to be driven by any one of the camshafts of the variable compression ratio engine, said unit then supplying the control actuator(s) and the lifter actuator(s) of said engine.

It is noted that, according to French Patent Application FR 2 896 539 or WO2007/085739 in the name of the Applicant, the hydraulic pressure provided to the control actuator may also be used to increase the speed of movement of said control actuator during operations designed to increase the volumetric ratio of the variable compression ratio engine. According to this latter variant, said hydraulic pressure is applied to the upper face of the upper rod of the control actuator by means of a chamber created in the cylinder head of said actuator.

It is noted that in the patent applications and patents in the name of the Applicant, the control rod may advantageously be replaced by solenoid valves which interact with at least one sensor, so as to simplify the production of the system for controlling the compression ratio of the variable compression ratio engine.

However, because of the difficulty represented by the production of solenoid valves that are both reliable, economical and compatible with the impurities and particles contained in the lubrication oil of the variable compression ratio engine, it has been proposed in French patent application FR 08/03589 in the name of the Applicant to replace said solenoid valves with a ball-lift compression ratio adjustment device which comprises at least two balls or valve elements each resting on a seat and respectively closing off one and the other end of a transfer channel connecting the upper chamber and the upper chamber of the control actuator of the variable compression ratio engine, said balls acting as a nonreturn valve element when they are held on their seat by a spring so as to allow the hydraulic fluid to pass in only one direction.

It can be seen in this latter patent application that said balls can be lifted from their seat by lifting means in order to allow said hydraulic fluid to pass in both directions, said lifting means lifting said balls by means of a cylindrical lifter. According to this patent application, the lifting means may consist of electromechanical actuators that can be produced according to various variants, two of them providing two lift heights for said balls from their seat, while another provides an incremental lift thereof. In said patent application, also claimed are two variants using piezoelectric components and a staged variant which comprises a piston making it possible to move the cylindrical lifter in longitudinal translation, said piston being able to use the pressure prevailing in the hydraulic power unit of the variable compression ratio engine by means of a solenoid valve in order to lift the ball from its seat.

The ball-lift device with screw for a variable compression ratio engine is designed to solve a set of problems associated with the ball-lift compression ratio adjustment device as described in French patent application FR 08/03589 in the name of the Applicant to which reference has just been made, amongst which:

the variants with two ball-lift heights do not make it possible to vary the lift height of said ball beyond said two lift heights, unless the electromagnetic suction cups proposed in the patent application are supplied with varying electric voltage—for example in opening duty cycle—but in this case with an uncertainty concerning the real height of lift of said ball;

the variant which proposes an incremental lift uses the friction existing between the cylindrical lifter and metal nonreturn strips with which it interacts, which has the drawback of having a durability and reliability that are difficult to ensure because of the wear of said lifter and of said strips;

the variant based on a stack of piezoelectric layers has the drawback of a small lift travel without having a considerable space requirement, while the variant put forward based on an "H"-shaped piezoelectric motor has the difficulty—as is the case for the variant with incremental lift—of not ensuring a repeatable and precise movement because of the abrasion of the walls between which said "H"-shaped piezoelectric motor moves;

the variant based on the piston that can use the pressure prevailing in the hydraulic power unit of the variable compression ratio engine by means of a solenoid valve to lift the ball from its seat has the drawback of the lift height of the ball being impossible to control.

It is to solve various problems associated with the ball-lift compression ratio adjustment device for a variable compression ratio engine as described in French patent FR 08/03589 cited as a reference, that the ball-lift device with screw for a variable compression ratio engine proposes:

to control the lift height of the ball continuously with high precision;

to prevent any phenomenon of wear that is of a type to affect the precision or repeatability of the lift height of said ball.

The ball-lift device with screw of a variable compression ratio engine comprising a hydraulic double-acting control actuator comprising an upper chamber and a lower chamber and at least one actuator piston connected to a control rack according to the present invention comprises:

at least two balls or valve elements each resting on a seat and closing off respectively one and the other end of a transfer channel connecting the upper chamber and the lower chamber of the control actuator, said balls acting as a nonreturn valve element when they are held on their seat by a spring in order to allow the hydraulic fluid to pass in only one direction;

and lifting means comprising at least one electric motor designed to rotate at least one screw making it possible to lift from or place on its seat at least one ball.

The ball-lift device with screw for a variable compression ratio engine according to the present invention comprises:

a control actuator the actuator piston of which is attached to the control rack by a lock screw;

and at least one compensating nonreturn valve element allowing the hydraulic fluid to come out of the transfer channel in order to return to a hydraulic power unit of the variable compression ratio engine containing a pressurized reserve of said fluid, but preventing said fluid from returning to said transfer channel.

The ball-lift device with screw for a variable compression ratio engine according to the present invention comprises lifting means that consist of a cylindrical lifter housed in the transfer channel, and at least one electric motor designed to rotate at least one screw making it possible to move said cylindrical lifter in longitudinal translation so that its end lifts from or places at least one ball on its seat.

The ball-lift device with screw for a variable compression ratio engine according to the present invention comprises a rotary electric motor that rotates the screw by means of mechanical transmission means.

The ball-lift device with screw for a variable compression ratio engine according to the present invention comprises a rotary electric motor simultaneously rotating two screws allowing each to lift from or place on their seat a ball or valve element, the first screw going in the direction of a first ball when the second screw moves away from a second ball and vice versa, said balls not being able to be lifted simultaneously from their seats.

The ball-lift device with screw for a variable compression ratio engine according to the present invention comprises a rotary electric motor which simultaneously rotates both screws by means of at least one gearwheel connecting said motor to said screws.

The ball-lift device with screw for a variable compression ratio engine according to the present invention comprises a rotary electric motor which simultaneously rotates both screws by means of at least one timing belt.

The ball-lift device with screw for a variable compression ratio engine according to the present invention comprises a rotary electric motor which simultaneously rotates both screws by means of at least one chain.

The ball-lift device with screw for a variable compression ratio engine according to the present invention comprises two screws which are rotated in the same direction, the first screw having a pitch that is the reverse of that of the second screw.

The ball-lift device with screw for a variable compression ratio engine according to the present invention comprises two screws which are simultaneously rotated in opposite directions from one another, the first screw being screwed in while the second screw is screwed out and vice versa.

The ball-lift device with screw for a variable compression ratio engine according to the present invention comprises a rotary electric motor which is furnished with an angular position sensor.

The ball-lift device with screw for a variable compression ratio engine according to the present invention comprises an actuator piston of the hydraulic double-acting control actuator which comprises two elastic end-of-stroke abutments which determine the maximum stroke of said piston, the first elastic abutment making it possible to limit the maximum compression ratio of the variable compression ratio engine when it comes into contact with the crankcase of said engine, the second elastic abutment making it possible to limit the minimum compression ratio of the variable compression ratio engine when it comes into contact with a cylinder head of the control actuator of said engine.

The ball-lift device with screw for a variable compression ratio engine according to the present invention comprises an actuator piston of the hydraulic double-acting control actuator attached to the control rack which comprises, between the lower face of said piston and the lower actuator rod of the control rack, an adjustment washer which makes it possible to adjust the position of said piston relative to said rack, so as to be able to adjust the compression ratio of the variable compression ratio engine when one or the other of the two elastic end-of-stroke abutments comes into contact either with the crankcase of said engine, this being the first abutment, or with the cylinder head of the control actuator of said engine, this being the second abutment.

The ball-lift device with screw for a variable compression ratio engine according to the present invention comprises an actuator piston which comprises a piston depressurizing duct which connects the lower chamber and the upper chamber of the hydraulic double-acting control actuator, said duct allowing the air that can form a pocket in said lower chamber to pass into said upper chamber.

The ball-lift device with screw for a variable compression ratio engine according to the present invention comprises a piston depressurizing duct which consists of a space left between the actuator piston and the lock screw calculated to form a pressure loss limiting the flow rate of hydraulic fluid between the lower chamber and the upper chamber of the hydraulic double-acting control actuator.

The ball-lift device with screw for a variable compression ratio engine according to the present invention comprises a piston depressurizing duct of the actuator piston which comprises a considerable space left between the actuator piston and the lock screw, said space allowing the hydraulic fluid to pass from the lower chamber to the upper chamber of the hydraulic double-acting control actuator, via a groove formed on the lower face of a depressurizing washer clamped between said lock screw and said actuator piston.

The ball-lift device with screw for a variable compression ratio engine according to the present invention comprises a groove whose depressurizing washer is in spiral form in order to have a great length, the beginning of said spiral leading into the central hole of said washer, while the end of said spiral leads into the periphery of said washer.

The ball-lift device with screw for a variable compression ratio engine according to the present invention comprises a piston depressurizing duct which consists of a depressurizing capillary duct formed or fitted in the body of the lock screw making it possible to attach the actuator piston to the control rack, the profile, the cross section and the length of said capillary duct being calculated to form a pressure loss limiting the passage of the hydraulic fluid between the lower chamber and the upper chamber of the control actuator.

The ball-lift device with screw for a variable compression ratio engine according to the present invention comprises a hydraulic double-acting control actuator which comprises an actuator depressurizing duct the inlet of which is positioned at the highest point of the upper chamber and the outlet of which opens into any point of the variable compression ratio engine, said actuator depressurizing duct being able to be closed off or opened by means of a depressurizing solenoid valve.

The ball-lift device with screw for a variable compression ratio engine according to the present invention comprises an upper chamber of the control actuator which comprises a resupply nonreturn valve element, said valve element allowing the pressurized hydraulic fluid from the hydraulic power unit of the variable compression ratio engine to enter said upper chamber, but not to leave it.

The ball-lift device with screw for a variable compression ratio engine according to the present invention comprises a lower chamber of the control actuator which comprises a resupply nonreturn valve element, said valve element allowing the pressurized hydraulic fluid from the hydraulic power unit of the variable compression ratio engine to enter said lower chamber, but not to leave it.

The ball-lift device with screw for a variable compression ratio engine according to the present invention comprises a plate fitted to the crankcase of the variable compression ratio engine in which the transfer channel is formed, said plate comprising the means for lifting the balls and the sealing means providing the seal between said transfer channel and ducts integrated into the crankcase. The following description with respect to the appended drawings, given as nonlimiting examples, will make it easier to understand the invention, the features that it proposes and the advantages that it is capable of providing:

FIGS. 4 to 6 are schematic views illustrating the operating principle of the ball-lift device with screw for a variable compression ratio engine according to the present invention.

DESCRIPTION OF THE INVENTION

Figure 1:
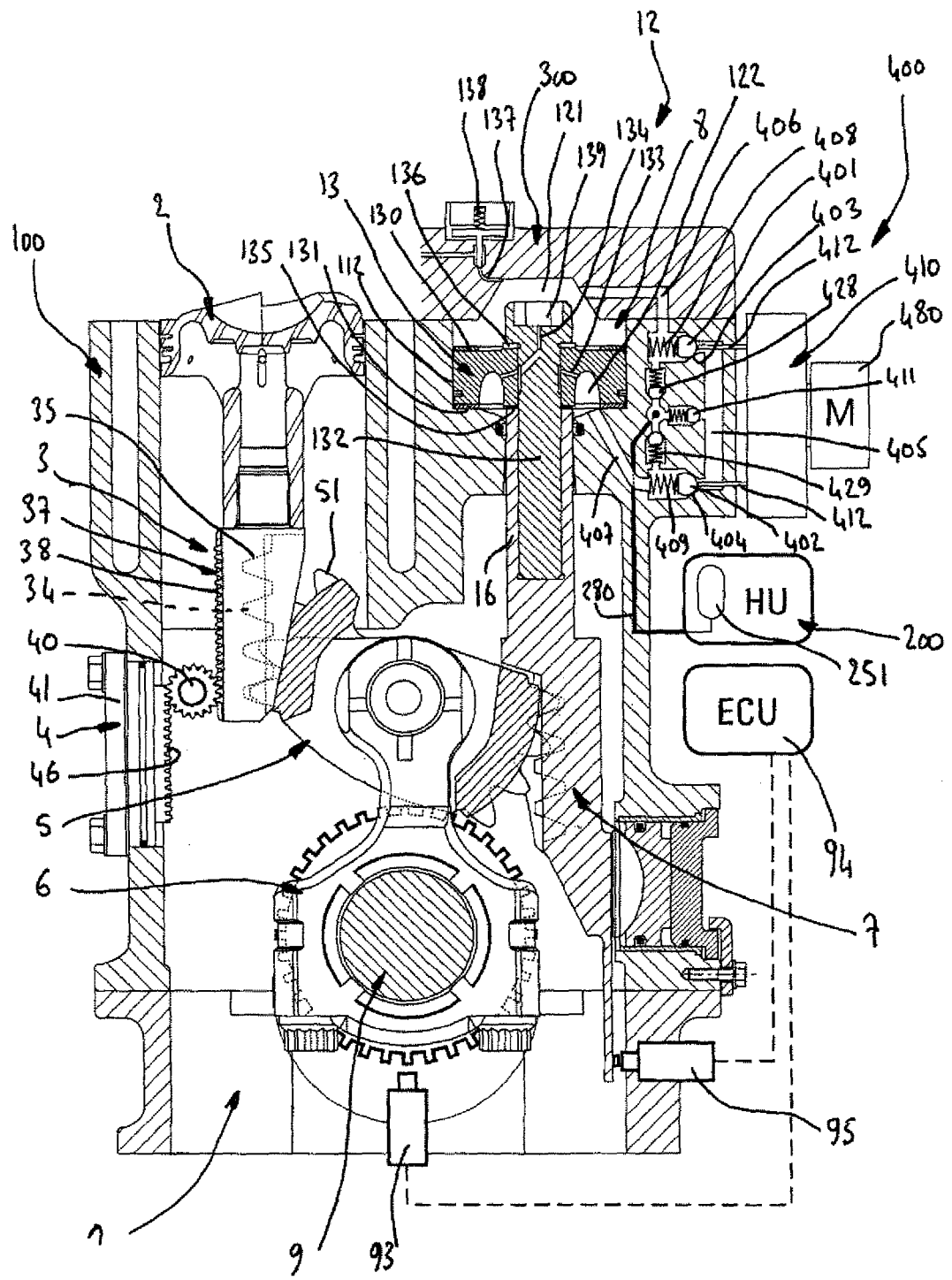
FIG. 1 is a schematic view in section illustrating the main components and their positions in the variable compression ratio engine of a ball-lift device with screw for a variable compression ratio engine according to the present invention.

FIG. 1 shows a device 400 for adjusting the compression ratio for a variable compression ratio engine comprising means for closing off at least one duct connecting the upper chamber 121 and lower chamber 122 of a hydraulic double-acting control actuator 8, and lifting means making it possible to lift from or place on its seat the closing-off means in order to allow the hydraulic fluid to pass in both directions.

According to the patent applications and patents belonging to the Applicant, the variable compression ratio engine comprises a mechanical transmission device 1 comprising, in the lower portion of the combustion piston 2, a transmission member 3 called a "piston rack" secured to said piston and interacting, on the one hand, with a rolling guidance device 4 and, on the other hand, with a gearwheel 5.

The transmission member or piston rack 3 secured to the piston 2 is provided on one of its faces with a first large-dimension rack 35 the teeth 34 of which interact with those 51 of the gearwheel 5.

The transmission member or piston rack 3 comprises, on the other side from the first rack 35, a second rack 37 of which the small-dimension teeth 38 interact with those of a roller 40 of the rolling guidance device 4.

The crankcase 100 is secured to a support 41 comprising racks 46 synchronizing the movement of the roller 40 of the rolling guidance device 4 with that of the piston 2.

The gearwheel 5 interacts with a connecting rod 6 connected to a crankshaft 9 in order to transmit the movement between the combustion piston 2 and said crankshaft 9.

The gearwheel 5 interacts on the other side from the transmission member or piston rack 3 with a control rack 7 the vertical position of which relative to the crankcase 100 is driven by a control device 12 comprising the control actuator 8, and an actuator piston 13 which is guided in an actuator cylinder 112 created in the crankcase 100.

The control actuator 8 comprises, above and below the actuator piston 13, an upper chamber 121 and a lower chamber 122, said chambers having a displacement that differs from one another for the same stroke of the actuator piston 13.

The control actuator 8 consists of a lower actuator rod 16 secured to the control rack 7 and of a lock screw 132 making it possible to attach the actuator piston 13 to said lower actuator rod 16 of the control rack 7.

The lock screw 132 comprises a locking head 139 housed in the upper chamber 121 of the control actuator 8.

The actuator piston 13 of the hydraulic double-acting control actuator 8 may comprise two elastic end-of-stroke abutments 130, 131 which determine the maximum stroke of said actuator piston.

The first abutment 131 makes it possible to limit the maximum compression ratio of the variable compression ratio engine when it comes into contact with the crankcase 100 of said engine, while the second abutment 130 makes it possible to limit the minimum compression ratio of the variable compression ratio engine when it comes into contact with the cylinder head 300 of the control actuator 8 of said engine.

The actuator piston 13 of the hydraulic double-acting control actuator 8 comprises, between the lower face of said piston 13 and the lower actuator rod 16 of the control rack 7, an adjustment washer 135 which makes it possible to adjust the position of said piston 13 relative to said rack 7.

This adjustment washer 135 makes it possible to adjust the compression ratio of the variable compression ratio engine when one or the other of the two elastic end-of-stroke abutments 130, 131 comes into contact either with the crankcase 100 of said engine, this being the first abutment 131, or with the cylinder head 300 of the control actuator 8 of said engine, this being the second abutment 130.

The actuator piston 13 comprises a piston depressurizing duct 133 which connects the lower chamber 122 and the upper chamber 121 of the hydraulic double-acting control actuator 8. The piston depressurizing duct 133 allows the air forming a pocket in the lower chamber 122 to pass into the upper chamber 121.

The piston depressurizing duct 133 may consist of a space left between the actuator piston 13 and the lock screw 132 calculated to form a pressure loss limiting the flow rate of hydraulic fluid between the lower chamber 122 and the upper chamber 121 of the hydraulic double-acting control actuator 8.

The piston depressurizing duct 133 of the actuator piston 13 may comprise a considerable space left between the actuator piston 13 and the lock screw 132, said space allowing the hydraulic fluid to pass from the lower chamber 122 to the upper chamber 121 of the hydraulic double-acting control actuator 8, via a groove formed on the lower face of a depressurizing washer 136 clamped between said lock screw 132 and said actuator piston 13.

The profile, the cross section and the length of the groove are calculated to form a pressure loss limiting the passage of said fluid between the lock screw 132 and the actuator piston 13 of the hydraulic double-acting control actuator 8.

The groove formed in the depressurizing washer 136 may be in spiral form in order to have a great length, the beginning of said spiral leading into the central hole of said washer, while the end of said spiral leads into the periphery of said washer.

The piston depressurizing duct 133 of the actuator piston 13 communicates with a depressurizing capillary duct 134 formed or fitted in the body of the lock screw 132. The profile, the cross section and the length of the depressurizing capillary duct 134 are calculated to form a pressure loss limiting the passage of the hydraulic fluid between the lower chamber 122 and the upper chamber 121 of the hydraulic double-acting control actuator 8.

The hydraulic double-acting control actuator 8 may comprise an actuator depressurizing duct 137 the inlet of which is positioned at the highest point of the upper chamber 121 and the outlet of which opens into any point of the variable compression ratio engine.

The outlet of the actuator depressurizing duct 137 leads directly or indirectly into the lubrifying oil sump 500 of said engine. The actuator depressurizing duct 137 may be closed off or opened by means of a depressurizing solenoid valve 138.

The variable compression ratio engine may comprise at least one position sensor 95 making it possible to measure the vertical position of the control rack 7.

The variable compression ratio engine may comprise at least one sensor detecting the passage of the piston rack 3 so as to be able to deduce therefrom the compression ratio of said engine taking account of the angular position of the crankshaft 9 at which the passage of the piston rack 3 has been detected.

The variable compression ratio engine may comprise at least one pressure sensor, not shown, which makes it possible to measure the pressure that prevails in the upper chamber 121 of the hydraulic double-acting control actuator 8.

The variable compression ratio engine may comprise at least one pressure sensor, not shown, which makes it possible to measure the pressure that prevails in a combustion chamber of a combustion piston 2.

The variable compression ratio engine may comprise at least one crankshaft angular position sensor 93 and at least one computer 94.

The device 400 for adjusting the compression ratio according to the present invention comprises closing-off means which consist of at least two balls 401, 402 or valve elements each resting on a seat 403, 404 and respectively closing off one and the other end of a transfer channel 405, connecting by means of ducts 406, 407 incorporated into the crankcase 100 the upper chamber 121 and the lower chamber 122 of the hydraulic double-acting control actuator 8.

The balls 401, 402 act as a nonreturn valve element when they are held on their seats 403, 404 by a spring 408, 409 so as to allow the hydraulic fluid to pass in only one direction.

The device 400 for adjusting the compression ratio according to the present invention comprises lifting means 410 making it possible to lift from or place on its seat 403, 404 at least one ball 401, 402 or valve element.

The device 400 for adjusting the compression ratio comprises at least one compensating nonreturn valve element 411 allowing the hydraulic fluid to come out of the transfer channel 405 in order to return to a hydraulic power unit 200 of the variable compression ratio engine containing a pressurized reserve 251 of said fluid, but preventing said fluid from returning to said transfer channel 405.

The lifting means 410 of the device 400 for adjusting the compression ratio consist, for each ball 401, 402, of a cylindrical lifter 412 housed in the transfer channel 405.

Figure 2:
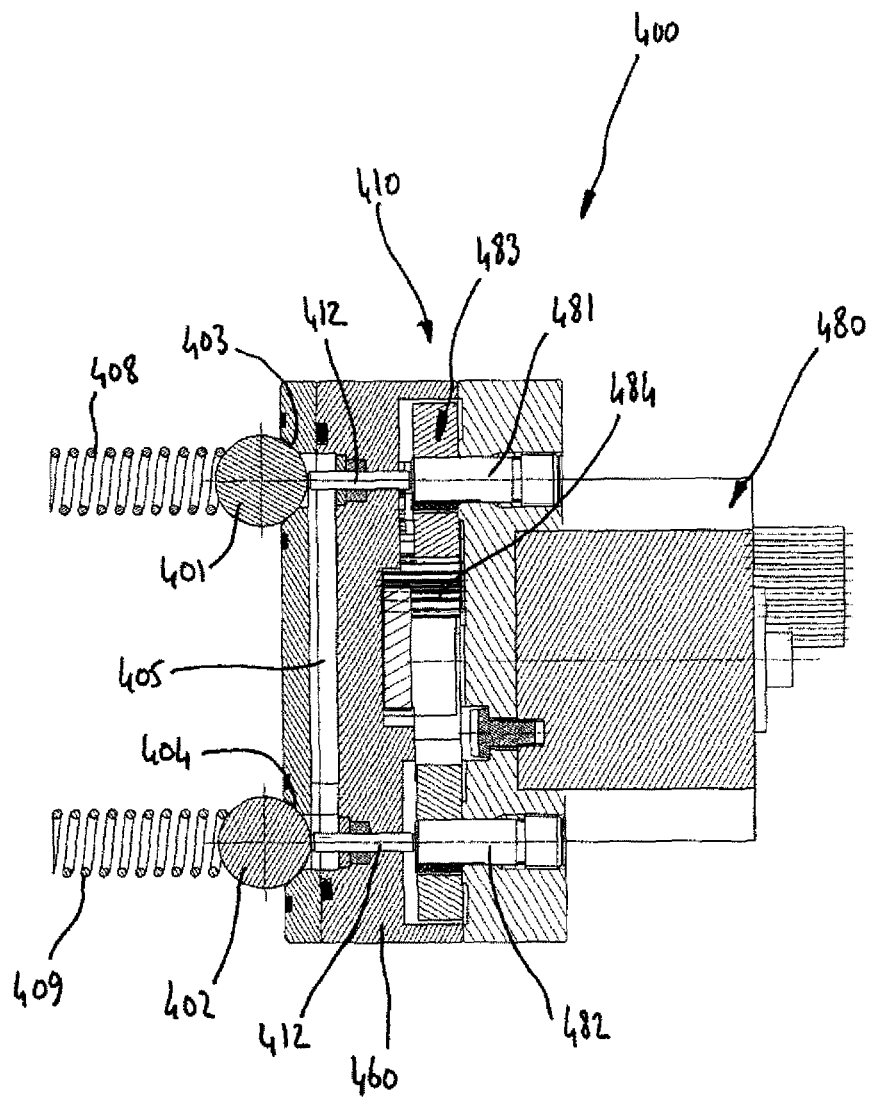
FIG. 2 is a view in section showing the means for driving the ball-lift device with screw for a variable compression ratio engine according to the present invention produced, for example, by means of at least one rotary electric motor designed to rotate at least one screw making it possible to lift or remove at least one ball or valve element from its seat.
Figure 3:
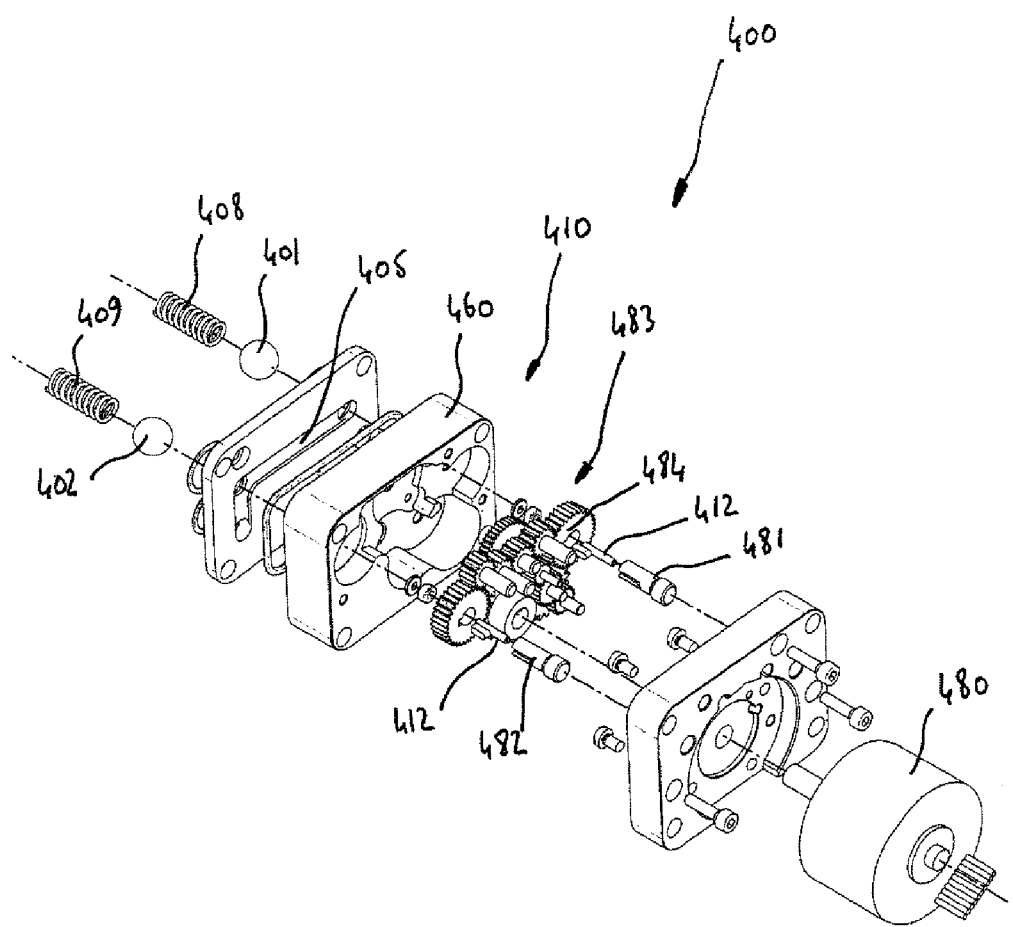
FIG. 3 is an exploded view in perspective representing the means for driving the ball-lift device with screw for a variable compression ratio engine according to the present invention.

FIGS. 2 and 3 show an exemplary embodiment, that is nonlimiting, of the compression ratio adjustment device 400 comprising an electric motor 480 making it possible to drive at least one screw 481, 482.

The lifting means 410 consist of at least one rotary electric motor 480 rotating at least one screw 481, 482 making it possible to move in longitudinal translation at least one cylindrical lifter 412 so that one of its ends comes into contact and then pushes the corresponding ball 401, 402 from or places it on its seat 403, 404.

The lifting means 410 consist of at least one rotary electric motor 480 designed to rotate, by means of mechanical transmission means 483, at least one screw 481, 482 making it possible with the aid of the cylindrical lifter 412 to lift from or place on its seat 403, 404 at least one ball 401, 402.

The rotary electric motor 480 simultaneously rotates two screws 481, 482 allowing each to lift from or deposit on their seat 403, 404 a ball 401, 402 or valve element, the first screw 481 going in the direction of a first ball 401 when the second screw 482 moves away from a second ball 402 and vice versa, said balls 401, 402 not being able to be lifted simultaneously from their seats 403, 404.

The rotary electric motor 480 simultaneously rotates both screws 481, 482 by means of at least one gearwheel 484 connecting said motor 480 to said screws.

The rotary electric motor 480 simultaneously rotates both screws 481, 482 by means of at least one timing belt, not shown.

The rotary electric motor 480 simultaneously rotates both screws 481, 482 by means of at least one chain, not shown.

Both screws 481, 482 are rotated in the same direction, the first screw 481 having a pitch that is the reverse of that of the second screw 482.

Both screws 481, 482 are simultaneously rotated in opposite directions from one another, the first screw 481 being screwed in while the second screw 482 is unscrewed and vice versa.

The rotary electric motor 480 according to the present invention is furnished with an angular position sensor, not shown. Said motor may also be a stepping motor known per se.

Equally, the device 400 for adjusting the compression ratio according to the present invention comprises a nonreturn valve element 428 making it possible to resupply the upper chamber 121 of the hydraulic double-acting control actuator 8. The resupply nonreturn valve element 428 allows the pressurized hydraulic fluid originating from the hydraulic power unit 200 of the variable compression ratio engine to enter the upper chamber 121 but not to leave it.

The ball-lift device 400 for adjusting the compression ratio according to the present invention comprises a nonreturn valve element 429 allowing the resupply of the lower chamber 122 of the hydraulic double-acting control actuator 8. The resupply nonreturn valve element 429 allows the pressurized hydraulic fluid originating from the hydraulic power unit 200 of the variable compression ratio engine to enter the lower chamber 122 but not to leave it.

Figure 7:
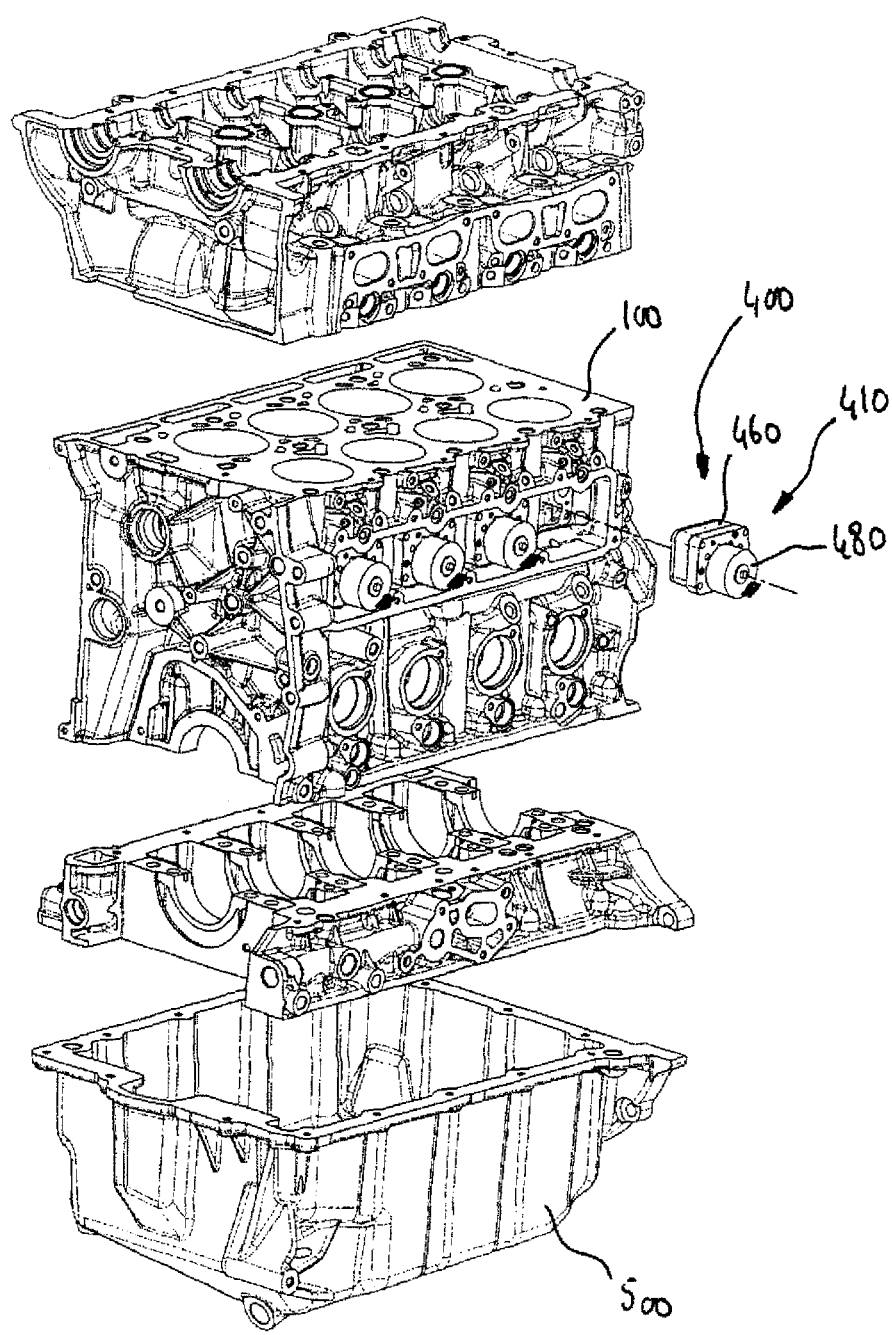
FIG. 7 is an exploded view in perspective showing the engine block of the variable compression ratio engine and the position of the ball-lift device with screw for a variable compression ratio engine according to the present invention on said engine block.

FIG. 7 illustrates the device 400 for adjusting the compression ratio, comprising a plate 460 fitted to the crankcase 100 of the variable compression ratio engine in which the transfer channel 405 is created.

Equally, the plate 460 supports the means 410 for lifting the balls 401, 402 of the device 400 for adjusting the compression ratio with screw 481, 482. The plate 460 comprises means which ensure the seal between the transfer channel 405 and the ducts 406, 407, incorporated into the crankcase 100, with which said transfer channel 405 communicates.

Operation:

According to a particular embodiment, the operation of the ball-lift device 400 with screw 481, 482 for a variable compression ratio engine is as follows:

The ball-lift device 400 for a variable compression ratio engine comprises at least one rotary electric motor 480 designed to rotate at least one screw 481, 482. The rotary electric motor 480 makes it possible to lift from or place on its seat 403, 404 at least one ball 401, 402 or valve element of the control actuator 8, said actuator making it possible to control the compression ratio of the variable compression ratio engine (FIGS. 4 to 6).

When the variable compression ratio engine is used at a given compression ratio and in the absence of any variation of said compression ratio, the two balls 401, 402, which make it possible respectively to allow the hydraulic fluid to pass from the upper chamber 121 to the lower chamber 122 of the control actuator 8 and vice versa, rest on their seat 403, 404.

In this case, said fluid can move neither from the upper chamber 121 to the lower chamber 122 nor in the opposite direction, which has the effect of maintaining the position of the control actuator 8 of the variable compression ratio engine at a determined value, and of keeping the compression ratio of said engine fixed.

Taking account of the operating conditions of the variable compression ratio engine, it is regularly necessary to adapt the compression ratio thereof. Depending on the case, this variation of the compression ratio of said engine is used to maximize the performance or the efficiency of said engine or else to improve the operation of the three-way catalytic converter thereof.

If, taking account of these various necessities, the computer 94 (ECU) of the variable compression ratio engine has to increase the compression ratio of said engine, said computer 94 sends an electric current to the rotary electric motor 480 so as to screw in the screw 482 positioned facing the ball 402 of the lower actuator chamber 122 which has the effect of lifting said ball 402 from its seat 404 by means of its cylindrical lifter 412.

Therefore, the lifting of the ball 402 from its seat 404 allows the hydraulic fluid to leave the lower chamber 122 of the control actuator 8 and to enter the upper chamber 121 via the transfer channel 405, the ball 401 of the upper chamber 121 of the control actuator 8 for its part allowing the hydraulic fluid to enter said upper chamber 121, but not allowing it to leave again because of its nonreturn effect.

As can be seen in FIG. 1, no hydraulic pump is necessary to move the actuator piston 13.

Said movement is actually provided by the alternating forces that are impressed on said piston 13 by the control rack 7 of the variable compression ratio engine to which it is attached, said rack itself being subjected to the forces resulting from the pressure of the gases contained in the combustion chamber of the engine and/or to the forces resulting from the inertia of the main moving parts of said engine which are the gearwheel 5, the combustion piston 2, the piston rack 3 and its rolling guidance device 4.

As can be easily deduced on looking at FIG. 1, the movement of the actuator piston 13 of the control actuator 8 toward the lower chamber 122 causes an increase in the volume of the upper chamber 121 which is greater than the reduction in volume of the lower chamber 122, this resulting from the absence of the upper actuator rod which is replaced by a lock screw 132.

Because of this, the pressure in the upper chamber 121 reduces when the actuator piston 13 moves toward the lower chamber 122, and the resupply nonreturn valve element 428 of the upper chamber 121 allows the pressurized hydraulic fluid originating from the hydraulic power unit 200 of the variable compression ratio engine to enter said upper chamber 121.

Conversely, when the computer 94 (ECU) of the variable compression ratio engine has to reduce the compression ratio of said engine, it sends an electric current to the rotary electric motor 480 in order to screw in the screw 481 positioned facing the ball 401 of the upper chamber 121 of the control actuator 8, which has the effect of lifting said ball 401 from its seat 403, by means of its cylindrical lifter 412.

Thus the lifting of the ball 401 from its seat 403 allows the hydraulic fluid to leave the upper chamber 121 of the control actuator 8 and to enter the lower chamber 122 via the transfer channel 405, while the ball 402 of the lower chamber 122 of the control actuator 8 for its part allows the hydraulic fluid to enter said lower chamber 122 but does not allow it to leave again because of its nonreturn effect.

As can be easily deduced by looking at FIG. 1, the movement of the actuator piston 13 of the control actuator 8 toward the upper chamber 121 causes an increase in volume of the lower chamber 122 that is less than the reduction in volume of the upper chamber 121 because of the absence of the upper actuator rod replaced by the lock screw 132.

Because of this, the pressure in the chambers 121, 122 and in the transfer channel 405 becomes greater than that prevailing in the hydraulic power unit 200 when the actuator piston 13 moves toward the upper chamber 121. Consequently, the compensating nonreturn valve element 411, of which the outlet leads via a duct 280 into the hydraulic power unit 200, allows the pressurized hydraulic fluid originating from the upper chamber 121 to leave toward said hydraulic power unit via the transfer channel 405.

Note in this case that the volume of hydraulic fluid expelled by the control actuator 8 to the hydraulic power unit 200 via the compensating nonreturn valve element 411 is approximately equal to the difference between the volume of the upper chamber 121 swept by the actuator piston 13 and the volume of the lower chamber 122 simultaneously swept by said piston 13 during the movement operation carried out by said piston, said operation being designed to reduce the compression ratio of the variable compression ratio engine.

As can be seen, the combined action of the balls 401, 402 and of the alternating forces applied to the actuator piston 13 by the other movable components of the variable compression ratio engine defines an operation which is similar to that of a nonreturn ratchet, said piston 13 being able to move in the direction of the chamber 121 or 122 in the case in which the ball 401, 402 is kept open by its screw 481, 482, but not in the reverse direction.

Whether it involves a movement designed to increase the compression ratio of the variable compression ratio engine or another designed to reduce it, the moment when the corresponding ball 401, 402 kept lifted by its screw 481, 482 is to be replaced on its seat 403, 404 is determined by the computer 94 (ECU) of the variable compression ratio engine.

Said moment is deduced by said computer 94 (ECU) based on the position of the control rack 7, said position for its part being returned by a position sensor 95 with which it interacts, and said sensor permanently measuring the vertical position of said rack 7.

Thus informed, the computer 94 (ECU) can replace the ball 401, 402 on its seat 403, 404 when said control rack 7 has reached the position corresponding to the compression ratio sought.

As illustrated in FIGS. 4 to 6, both balls 401, 402 can never be lifted simultaneously from their seat 403, 404 by the electric motor 480 by means of the screws 481, 482.

The interaction between the computer 94 (ECU) and the position sensor 95 of the control rack 7 also makes it possible to compensate for any drift in the position of said control rack 7 that may result from various leaks, whether it involves a leak between the upper chamber 121 and lower chamber 122 of the control actuator 8 due to a sealing defect of the gasket of the actuator piston 13, or whether it involves leaks between any one of said chambers 121, 122 and the outside of the control actuator 8.

In this case, the computer 94 (ECU) can instruct the temporary lifting of the ball 401, 402 of the chamber opposite to the direction of the drift of the actuator piston 13 until said piston returns to the required position.

Moreover, the computer 94 (ECU) can also instruct the partial lifting of the ball 401, 402 of the chamber opposite to the direction of the drift of the actuator piston 13 so as to compensate for said drift.

When a leak occurs between any one of the chambers, the upper chamber 121 and/or lower chamber 122, and the outside of the control actuator 8, said actuator is resupplied with hydraulic fluid by the resupply nonreturn valve element 428 of the upper chamber 121, directly involving the upper chamber, or indirectly via said upper chamber and the transfer channel 405 when the ball 401 of said upper chamber 121 is open or slightly open, involving the lower chamber 122.

According to a particular embodiment of the ball-lift device 400 with screw for a variable compression ratio engine according to the invention, in addition to the position of the control rack 7 which is transmitted permanently to the computer 94 (ECU) by a position sensor 95, said computer can also be informed on the angular position of the crankshaft 9 of the variable compression ratio engine by the crankshaft angular sensor 93, known per se, of said engine.

According to this embodiment, the pressure difference between the upstream and the downstream of the ball 401 of the upper chamber 121 and the ball 402 of the lower chamber 122 when said balls 401, 402 rest on their seat 403, 404 will have been previously recorded in the memory of the computer 94 (ECU) for various angular positions of said crankshaft 9 corresponding to various points of speed and of load of the variable compression ratio engine.

These prerecorded values allow the computer 94 (ECU) to deduce the pressure difference between the upstream and the downstream of the balls 401, 402 of the upper chamber 121 and of the lower chamber 122 of the control actuator 8 at every point of speed and of load of said engine and for every angular position of the crankshaft 9.

According to this embodiment, the computer 94 (ECU) can initiate the lifting of the ball 401, 402 of the upper chamber 121 or lower chamber 122 of the control actuator 8 at an angle of crankshaft 9 corresponding to a slight pressure difference between the upstream and the downstream of said ball in order to allow the lifting of said ball 401, 402 from its seat 403, 404 by its screw 481, 482 without requiring the rotary electric motor 480 to produce a high power and/or torque.

Moreover, according to this embodiment, the computer 94 (ECU) can anticipate the behavior of the control actuator 8 with good accuracy because said computer 94 (ECU) then has the information necessary to predict the number of degrees of rotation of the crankshaft 9 that are required to allow the quantity of hydraulic fluid to pass between the ball 401, 402 of the upper chamber 121 or lower chamber 122 of the control actuator 8 and its seat 403, 404 which allows the actuator piston 13 to reach its new positional setpoint.

The computer 94 (ECU) can therefore deduce therefrom the height and the duration of the lift of the ball 401, 402 on its seat 403, 404 that are necessary for the actuator piston 13 to reach its new positional setpoint.

Note that the height of the lift and the duration of the lift of the ball 401, 402 may be corrected by the computer 94 (ECU) as a function of the viscosity of the hydraulic fluid, in order to increase the precision of positioning of the actuator piston 13. Said viscosity can notably be deduced by the computer 94 (ECU) based on the temperature of the hydraulic fluid, said temperature for its part being transmitted by a sensor, not shown.

Note that the ball-lift device 400 with screw 481, 482 makes it possible to lift the balls 401, 402 of the upper chamber 121 or lower chamber 122 of the control actuator 8 from their seat 403, 404 over an infinity of heights, between a zero height when said ball 401, 402 is in contact with its seat 403, 404 and a maximum height when said ball is in contact with its maximum lift abutment.

For a given force applied to the actuator piston 13 of the control actuator 8 by the control rack 7, the large lift heights make it possible to obtain a high speed of movement of said piston, while the small lift heights make it possible to obtain a low speed of movement of said piston.

Said high speed makes it possible to go rapidly from a position of the actuator piston 13 that is far away from the setpoint position to another position adjacent to said setpoint position, while said low speed makes it possible to go from said position adjacent to said setpoint position to said setpoint position.

Said low speed can also be used to compensate for the slow drift of the actuator piston 13 induced by possible leaks, or to go from one setpoint position to another setpoint position when said positions are close to one another.

It should moreover be understood that the foregoing description has been given only as an example and that it in no way limits the scope of the invention which would not be departed from by replacing the described details of execution with any other equivalent.

The invention claimed is:

1. A ball-lift device with screw for a variable compression ratio engine comprising:
   a hydraulic double-acting control actuator (8) comprising an upper chamber (121) and a lower chamber (122) and at least one actuator piston (13) connected to a control rack (7);
   at least two balls (401, 402) or valve elements each resting on a seat (403, 404) and closing off respectively one and the other end of a transfer channel (405) connecting the upper chamber (121) and the lower chamber (122) of the control actuator (8), said balls (401, 402) acting as a nonreturn valve element when they are held on their seat (403, 404) by a spring (408, 409) in order to allow hydraulic fluid to pass in only one direction;
   and lifting means (410) comprising at least one electric motor (480) designed to rotate at least one screw (481, 482) making it possible to lift from or place on a seat (403, 404) of the lifting means (410) at least one ball (401, 402).

2. The ball-lift device with screw for a variable compression ratio engine according to claim 1, further comprising:
   a lock screw (132) constructed and arranged to attach the actuator piston (13) of the control actuator (8) to the control rack (7);
   and at least one compensating nonreturn valve element (411) allowing the hydraulic fluid to come out of the transfer channel (405) in order to return to a hydraulic power unit (200) of the variable compression ratio engine containing a pressurized reserve (251) of said fluid, but preventing said fluid from returning to said transfer channel.

3. The ball-lift device with screw for a variable compression ratio engine according to claim 1, wherein the lifting means (410) consist of a cylindrical lifter (412) housed in the transfer channel (405), and the at least one electric motor (480) designed to rotate the at least one screw (481, 482) making it possible to move said cylindrical lifter (412) in longitudinal translation so that an end of the cylindrical lifter (412) lifts or places from the seat (403, 404) the at least one ball (401, 402).

4. The ball-lift device with screw for a variable compression ratio engine according to claim 1, wherein the rotary electric motor (480) rotates the screw (481, 482) by means of mechanical transmission (483).

5. The ball-lift device with screw for a variable compression ratio engine according to claim 1, wherein the rotary electric motor (480) simultaneously rotates first and second screws (481, 482) allowing each to lift from or place on their seat (403, 404) a ball (401, 402) or valve element, the first screw (481) going in the direction of a first ball (401) when the second screw (482) moves away from a second ball (402) and vice versa, said balls (401, 402) not being able to be lifted simultaneously from their seat (403, 404).

6. The ball-lift device with screw for a variable compression ratio engine according to claim 5, wherein the rotary electric motor (480) simultaneously rotates both the first and the second screws (481, 482) by means of at least one gearwheel (484) connecting said motor to said first and second screws.

7. The ball-lift device with screw for a variable compression ratio engine according to claim 5, wherein the rotary electric motor (480) simultaneously rotates both the first and the second screws (481, 482) by means of at least one timing belt.

8. The ball-lift device with screw for a variable compression ratio engine according to claim 5, wherein the rotary electric motor (480) simultaneously rotates both the first and the second screws (481, 482) by means of at least one chain.

9. The ball-lift device with screw for a variable compression ratio engine according to claim 5, wherein both the first and the second screws (481, 482) are rotated in the same direction, the first screw having a pitch that is the reverse of that of the second screw.

10. The ball-lift device with screw for a variable compression ratio engine according to claim 5, wherein both the first and the second screws (481, 482) are simultaneously rotated in opposite directions from one another, the first screw being screwed in while the second screw is screwed out and vice versa.

11. The ball-lift device with screw for a variable compression ratio engine according to claim 1, wherein the rotary electric motor (480) is furnished with an angular position sensor.

12. The ball-lift device with screw for a variable compression ratio engine according to claim 1, wherein the actuator piston (13) of the hydraulic double-acting control actuator (8) comprises two elastic end-of-stroke abutments (130, 131) which determine the maximum stroke of said piston, a first elastic abutment (131) of the two elastic end-of-stroke abutments (130, 131) making it possible to limit the maximum compression ratio of the variable compression ratio engine when the variable compression ratio engine comes into contact with a crankcase (100) of said engine, a second elastic abutment (130) of the two elastic end-of-stroke abutments (130, 131) making it possible to limit the minimum compression ratio of the variable compression ratio engine when the variable compression ratio engine comes into contact with a cylinder head (300) of the control actuator (8) of said engine.

13. The ball-lift device with screw for a variable compression ratio engine according to claim 12, wherein the actuator piston (13) of the hydraulic double-acting control actuator (8) attached to the control rack (7) comprises, between the lower face of said piston (13) and a lower actuator rod (16) of the control rack (7), an adjustment washer (135) which makes it possible to adjust positioning of said piston relative to said rack, so as to be able to adjust a compression ratio of the variable compression ratio engine when one or the other of the two elastic end-of-stroke abutments (130, 131) comes into contact either with the crankcase (100) of said engine constructed and arranged to be the first abutment (131), or with the cylinder head (300) of the control actuator (8) of said engine constructed and arranged to be the second abutment (130).

14. The ball-lift device with screw for a variable compression ratio engine according to claim 2, wherein the actuator piston (13) comprises a piston depressurizing duct (133) which connects the lower chamber (122) and the upper chamber (121) of the hydraulic double-acting control actuator (8), said duct allowing air that can form a pocket in said lower chamber (122) to pass into said upper chamber (121).

15. The ball-lift device with screw for a variable compression ratio engine according to claim 14, wherein the piston depressurizing duct (133) consists of a space left between the actuator piston (13) and the lock screw (132) calculated to form a pressure loss limiting the flow rate of hydraulic fluid between the lower chamber (122) and the upper chamber (121) of the hydraulic double-acting control actuator (8).

16. The ball-lift device with screw for a variable compression ratio engine according to claim 14, wherein the piston depressurizing duct (133) of the actuator piston (13) comprises a considerable space left between the actuator piston (13) and the lock screw (132), said space allowing the hydraulic fluid to pass from the lower chamber (122) to the upper chamber (121) of the hydraulic double-acting control actuator (8), via a groove formed on the lower face of a depressurizing washer (136) clamped between said lock screw (132) and said actuator piston (13).

17. The ball-lift device with screw for a variable compression ratio engine according to claim 16, wherein the groove that the depressurizing washer (136) comprises is in spiral form in order to have a great length, the beginning of said spiral leading into a central hole of said washer, while the end of said spiral leads into a periphery of said washer.

18. The ball-lift device with screw for a variable compression ratio engine according to claim 14, wherein the piston depressurizing duct (133) consists of a depressurizing capillary duct (134) formed or fitted in a body of the lock screw (132) making it possible to attach the actuator piston (13) to the control rack (7), a profile, a cross section and a length of said capillary duct (134) being calculated to form a pressure loss limiting passage of the hydraulic fluid between the lower chamber (122) and the upper chamber (121) of the control actuator (8).

19. The ball-lift device with screw for a variable compression ratio engine according to claim 1, wherein the hydraulic double-acting control actuator (8) comprises an actuator depressurizing duct (137) an inlet of which is positioned at the highest point of the upper chamber (121) and the outlet of which opens into any point of the variable compression ratio engine, said actuator depressurizing duct (137) being able to be closed off or opened by means of a depressurizing solenoid valve (138).

20. The ball-lift device with screw for a variable compression ratio engine according to claim 2, wherein the upper chamber (121) of the control actuator (8) comprises a resupply nonreturn valve element (428), said valve element allowing the hydraulic fluid, the hydraulic fluid being pressurized, from the hydraulic power unit (200) of the variable compression ratio engine to enter said upper chamber (121), but not to leave the upper chamber (121).

21. The ball-lift device with screw for a variable compression ratio engine according to claim 2, wherein the lower chamber (122) of the control actuator (8) comprises a resupply nonreturn valve element (429), said valve element allowing the hydraulic fluid, the hydraulic fluid being pressurized, from the hydraulic power unit (200) of the variable compression ratio engine to enter said lower chamber (122), but not to leave the lower chamber (122).

22. The ball-lift device with screw for a variable compression ratio engine according to claim 1, further comprising a plate (460) fitted to a crankcase (100) of the variable compression ratio engine in which the transfer channel (405) is formed, said plate comprising the means (410) for lifting the balls (401, 402) and sealing means providing the seal between said transfer channel (405) and ducts (406, 407) integrated into the crankcase (100).

* * * * *